US012730316B2

(12) United States Patent
Ide

(10) Patent No.: US 12,730,316 B2
(45) Date of Patent: Sep. 8, 2026

(54) OPTICAL MEASUREMENT DEVICE

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 548 days.

(21) Appl. No.: 18/190,974

(22) Filed: Mar. 28, 2023

(65) Prior Publication Data

US 2023/0314811 A1 Oct. 5, 2023

(30) Foreign Application Priority Data

Mar. 29, 2022 (JP) ................................ 2022-053755

(51) Int. Cl.
*G02B 27/01* (2006.01)
*G02B 5/00* (2006.01)
*G02F 1/29* (2006.01)

(52) U.S. Cl.
CPC ......... *G02B 27/0172* (2013.01); *G02B 5/005* (2013.01); *G02F 1/29* (2013.01); *G02B 2027/0127* (2013.01); *G02B 2027/0178* (2013.01)

(58) Field of Classification Search
CPC ................ G02B 27/0172; G02B 5/005; G02B 2027/0127; G02B 2027/0178; G02F 1/29
See application file for complete search history.

(56) References Cited

U.S. PATENT DOCUMENTS 6,537,208 B1 3/2003 Konno
2021/0389522 A1* 12/2021 Rowe ...................... G02F 1/292
2022/0050357 A1* 2/2022 Wang .................. G02B 27/646
2022/0163321 A1* 5/2022 Minamigawa ....... G01B 11/254
2025/0159127 A1* 5/2025 Chaji ................ G02B 27/0172

FOREIGN PATENT DOCUMENTS

CN 109073502 12/2018
CN 112857754 5/2021
JP 2001083400 3/2001
JP 2012058435 3/2012
WO 2017183582 10/2017
WO WO-2017183582 A1 * 10/2017 ............ G02B 27/02

* cited by examiner

*Primary Examiner* — Nathanael R Briggs
(74) *Attorney, Agent, or Firm* — JCIPRNET

(57) ABSTRACT

A first optical member where image light from a virtual image display device as a measurement target is incident, the first optical member being configured to emit incident image light, a second optical member where the image light emitted from the first optical member is incident, the second optical member being configured to emit, with telecentricity, incident image, a light reception member disposed along a first direction in which the first optical member and the second optical member are disposed side by side, and the light reception member being configured to receive the image light emitted from the second optical member, and an adjusting member configured to adjust a light path so as to form an image of image light received at a light reception surface of the light reception member, are provided.

19 Claims, 16 Drawing Sheets

OPTICAL MEASUREMENT DEVICE

The present application is based on, and claims priority from JP Application Serial Number 2022-053755, filed Mar. 29, 2022, the disclosure of which is hereby incorporated by reference herein in its entirety.

BACKGROUND

1. Technical Field

The present disclosure relates to an optical measurement device that performs measurement for a product including an optical system such as a virtual image display device, and the like.

2. Related Art

An optical characteristic measurement device that measures optical characteristics of the exit pupil of a virtual image display device including a moving member that moves an image sensor and a diaphragm up, down, left, or right is known (WO2017-183582).

However, the optical characteristic measurement device exemplified in WO2017-183582 does not include a mechanism for adjusting the optical characteristic measurement device side in accordance with the focal length of the light emitted from a head-mounted display (HMD) that is an example of a virtual image display device, and as such may not accurately measure the optical characteristics of the HMD.

SUMMARY

An optical measurement device according to an aspect of the present invention includes a first optical member where light from a measurement target is incident, the first optical member being configured to emit the incident light, a second optical member where the light emitted from the first optical member is incident, the second optical member being configured to emit, with telecentricity, the incident light, a light reception member disposed along a first direction in which the first optical member and the second optical member are disposed side by side, the light reception member being configured to receive the light emitted from the second optical member, and an adjusting member configured to adjust a light path so as to form an image of light received at a light reception surface of the light reception member.

DESCRIPTION OF EXEMPLARY EMBODIMENTS

First Embodiment

An optical measurement device according to a first embodiment of the present disclosure is described below with reference to the accompanying drawings.

Figure 1:
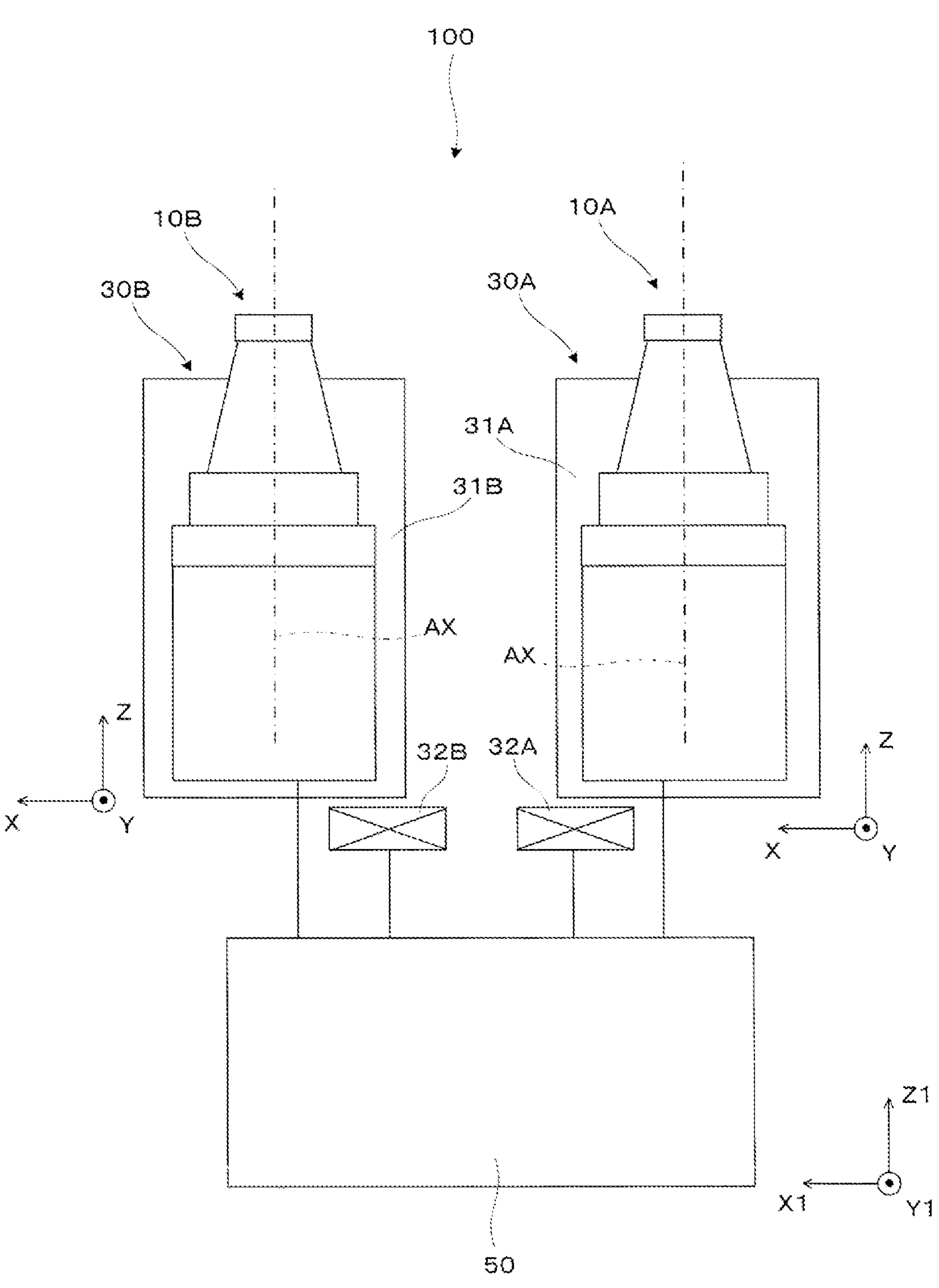
FIG. 1 is a plan view schematically illustrating an optical measurement device according to a first embodiment.

An optical measurement device 100 illustrated in FIG. 1 and the like is a measurement device (measurement system) of which the measurement target is a head-mounted display (HMD) as a form of a virtual image display device. The optical measurement device 100 includes a first imaging device 10A, a second imaging device 10B, a first posture changing device 30A, a second posture changing device 30B, and a control device 50. The first posture changing device 30A is composed of a stage 31A on which the first imaging device 10A is placed, and a driving device 32A that drives the stage 31A. The first posture changing device 30A changes the posture of the first imaging device 10A in accordance with the configuration of the measurement target and the like, for example. Likewise, the second posture changing device 30B is composed of a stage 31B and a driving device 32B, and changes the posture of the second imaging device 10B.

Figure 2:
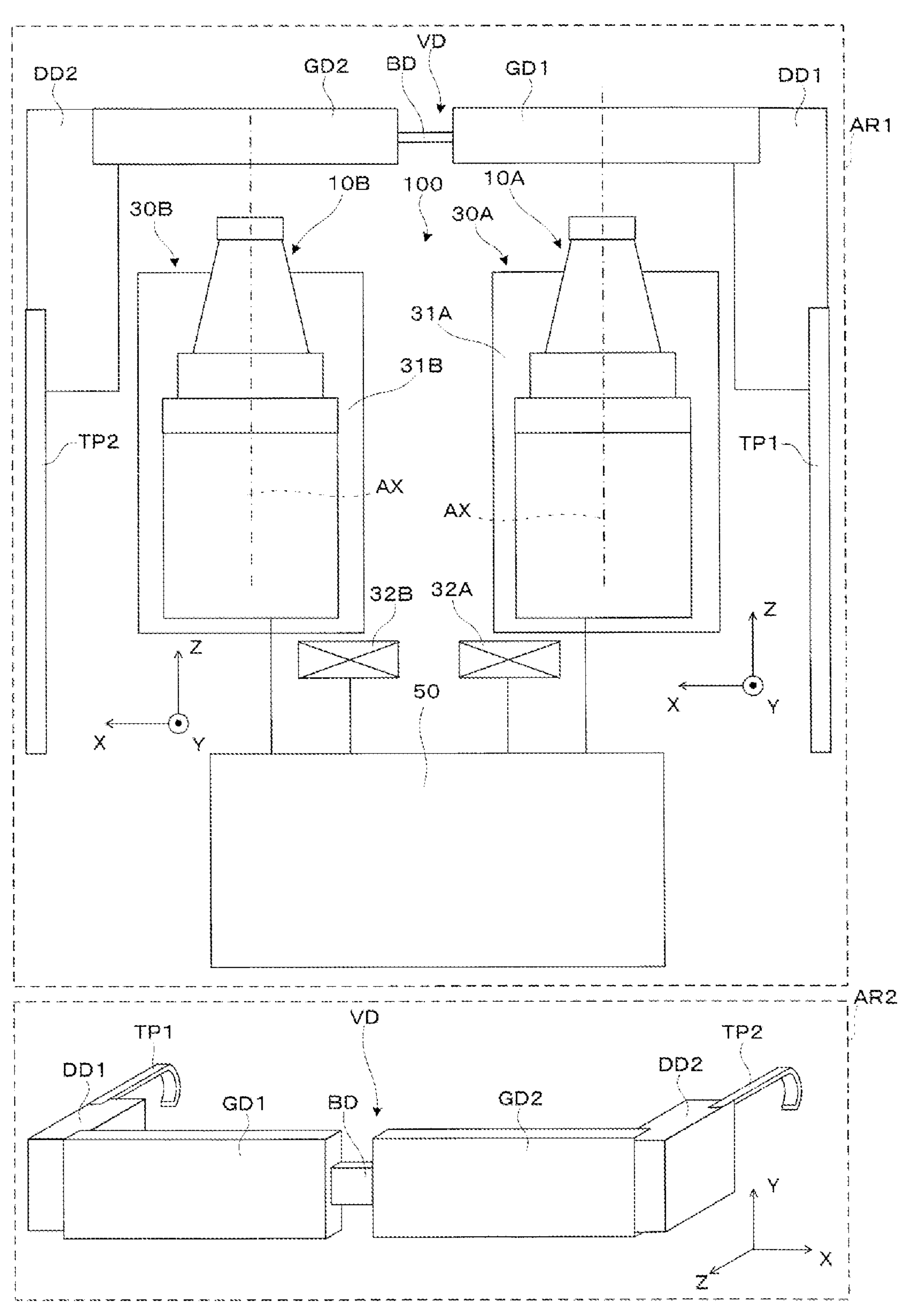
FIG. 2 is a diagram illustrating an optical measurement device and a virtual image display device serving as a measurement target.

In FIG. 2, a state AR1 is a schematic plan view illustrating a state where a virtual image display device (head-mounted display) VD serving as a measurement target is disposed for the optical measurement device 100 with the configuration described with reference to FIG. 1, and a state AR2 is a conceptual perspective view illustrating an external appearance of the virtual image display device VD. As illustrated in the drawing, the virtual image display device VD enables visual recognition with left and right eyes, and the optical measurement device 100 is a device for measuring the image light emitted from the virtual image display device VD, and evaluating the various optical performances for the virtual image display device VD serving as a product. In view of this, in the optical measurement device 100, the first imaging device 10A and the second imaging device 10B are disposed at locations corresponding to the positions of the left and right eyes of a human and to capture the light from the virtual image display device VD during use of the virtual image display device VD.

The control device 50 is connected to the first imaging device 10A and the second imaging device 10B. The control device 50 acquires image data resulting from imaging at the first imaging device 10A and the second imaging device 10B as measurement results (detection results), and makes a performance evaluation of the virtual image display device VD on the basis of this. In addition, the control device 50 is connected to the first posture changing device 30A and the second posture changing device 30B, and controls posture change of the first imaging device 10A and the second imaging device 10B. Note that while the control device 50 is connected to the above-described each unit in a wired manner in an example illustrated in the drawing, this is not limitative, and the control device 50 may be configured to acquire various data and perform operation control and the like through radio communication.

In FIG. 1 and the like, X1, Y1, and Z1 are orthogonal coordinate systems. In the case of a default position where the first imaging device 10A and the second imaging device 10B are disposed before posture change, the X1 direction is the direction in which the first imaging device 10A and the second imaging device 10B are disposed side by side. This corresponds to the lateral direction in which the eyes of the user (operator or wearer) wearing the virtual image display device VD are located side by side. In addition, the Y1 direction corresponds to the upward direction orthogonal to the lateral direction in which the eyes are located for the user, and the Z1 direction corresponds to the front direction or forward direction for the user. In view of the foregoing, the X, Y, and Z as orthogonal coordinate systems define the directions in the first imaging device 10A or the second imaging device 10B, and the Z direction is the front direction on the side of the object of the first imaging device 10A with respect to the first imaging device 10A, and also is the axis direction of an optical axis AX of the optical system making up the first imaging device 10A in the example illustrated in the drawing. In addition, the X direction is the horizontal direction of the first imaging device 10A, and the Y direction is the vertical direction. The same applies to the second imaging device 10B. Note that at the default position, the X1 direction, the Y1 direction, and the Z1 direction coincide with the X direction, the Y direction, and the Z direction, while they differ when a posture change using the first posture changing device 30A and the second posture changing device 30B is made, for example.

An overview of an exemplary configuration of the virtual image display device VD is described below with reference to FIG. 2. As described above, in the example described here, the virtual image display device VD enables visual recognition with both eyes with a pair of left and right configurations. More specifically, as a configuration for the right eye, the virtual image display device VD includes a display device DD1 that forms image light, a light guiding device GD1 that guides image light from the display device DD1 to a position in front of the eye and emits the image light in the direction (the −Z direction) where the eye is located, and a temple TP1 for support. In addition, as a configuration for the left eye, the optical measurement device 100 includes a display device DD2, a light guiding device GD2, and a temple TP2 as with the case of the right eye. Further, a bridge BD is provided between the light guiding device GD1 and the light guiding device GD2 so as to connect them. As described above, the virtual image display device VD has an eyeglasses-shaped external appearance as illustrated in the state AR2. In addition, here, while the light guiding device GD1 and the light guiding device GD2 guide image light in the above-described manner, they are optically transparent, and the user can observe the outside image in a see-through manner while visually recognizing the image of the image light. In addition, here, while the light guiding device GD1 and the light guiding device GD2 guide image light in the above-described manner, they are optically transparent, and the user can observe the outside image in a see-through manner while visually recognizing the image of the image light. Typically, the components of the image light corresponding to the light from each image forming position as a virtual image are parallelized and provided with an angle corresponding to each image forming position at the time point of the emission from the light guiding device GD1 and the light guiding device GD2, and the position where the batch of the light beams of the components of the image light is superimposed (intersected) and the batch of the light beams as the entirety of the image light becomes thinnest is formed as the exit pupil.

The optical measurement device 100 receives, at the first imaging device 10A corresponding to the right eye and the second imaging device 10B corresponding to the left eye, the image light emitted from the virtual image display device VD with the above-described configuration and forming the pupil, and the optical measurement device 100 makes a performance evaluation for the characteristics of the optical system making up the virtual image display device VD on the basis of the received result, i.e., the measurement result.

In the initial evaluation and mass production evaluation with the optical measurement device 100 for a head-mounted display (HMD) such as the virtual image display device VD, it is required that a large screen be taken at a time in a manner corresponding to the image (virtual image) of the virtual image display device VD. Specifically, in the optical measurement device 100, the first imaging device 10A and the second imaging device 10B desirably correspond to the field of view (FOV) of the image (video) of the virtual image display device VD. In particular, in the case where the measurement target is of a see-through type, it is anticipated that the optical system is disposed at the side head as in the virtual image display device VD illustrated in the example illustrated in the drawing, or the upper direction of the head. Further, a configuration close to eyeglasses as in the above-described virtual image display device VD results in a structure in which the gap between the virtual image display device VD and the user's head wearing it is eliminated. As such, if the imaging device serving as the first imaging device 10A and the second imaging device 10B is formed in a cylindrical shape, it may interfere with each unit of the virtual image display device VD and the imaging device may not be placed at the pupil position of the virtual image display device VD. In particular, in the prototyping stage, it is created in a simpler form than the product shape, and it is therefore normal that, for example, a lens barrel and/or a panel substrate is located in the head direction and the above-described interference problem may especially easily occur.

In addition, if a device, such as a typical camera, in which the diaphragm position is located inside the optical system is adopted as the imaging device placed at the pupil position of the virtual image display device VD, it means replacement with one with characteristics different from the human pupil hole. As such, it may not be possible to make an accurate evaluation. Further, in the case of a typical camera, the diaphragm in the lens is located on the inside as described above, and therefore the lens part of the camera relatively protrudes forward in comparison with the human eye. As such, a part of the light beam of the virtual image display device VD to be subjected to the performance evaluation may not be captured.

In view of this, this embodiment has a configuration in which when incident light forming the pupil as image light that is light from the virtual image display device VD serving as a measurement target, the image light that entered through a diaphragm (opening diaphragm), which is provided at the pupil position of the virtual image display device VD, is received in order to make the first imaging device 10A and the second imaging device 10B close to the human pupil hole and the like. Specifically, in the first imaging device 10A and the like, the above-described diaphragm (opening diaphragm) is disposed on the object side (+Z side) than the optical member (lens group) serving as the imaging lens. In addition, in the first imaging device 10A and the second imaging device 10B, the above-described optical member (lens group) has a shape with a size increasing from the object side (+Z side) toward the image side (−Z side), and further the size is small up to the portion including each unit such as the image sensor disposed at the rear stage of the optical member (lens group). Note that an example of the specific structure of the first imaging device 10A and the second imaging device 10B is described later with reference to FIGS. 4 and 5.

In measurement using the above-described optical measurement device 100, for example, in the first posture changing device 30A, of the first posture changing device 30A and the second posture changing device 30B, the stage 31A is a plate-shaped member parallel to the X1Z1 plane in the default state and is placed with the first imaging device 10A fixed to the surface. The driving device 32A can make parallel translation and axis rotation of the stage 31A on which the first imaging device 10A is placed in the three axial directions, i.e., the ±X1 direction, the ±Y1 direction and the ±Z1 direction, together with the first imaging device 10A. These movements are based on the assumption of human individual differences, i.e., differences in eye width and the like, and eye movement (rotation). Conceivably, the virtual image display device VD is configured to have some eye-box range based on the assumption that individual differences in the person wearing it, for example. In this embodiment, the eye-box range and the like of the virtual image display device VD is taken into account, and the first imaging device 10A placed on the stage 31A can be moved in the range corresponding to it. Note that also in the second posture changing device 30B, similar operation can be performed with the stage 31B and the driving device 32B.

Figure 3:
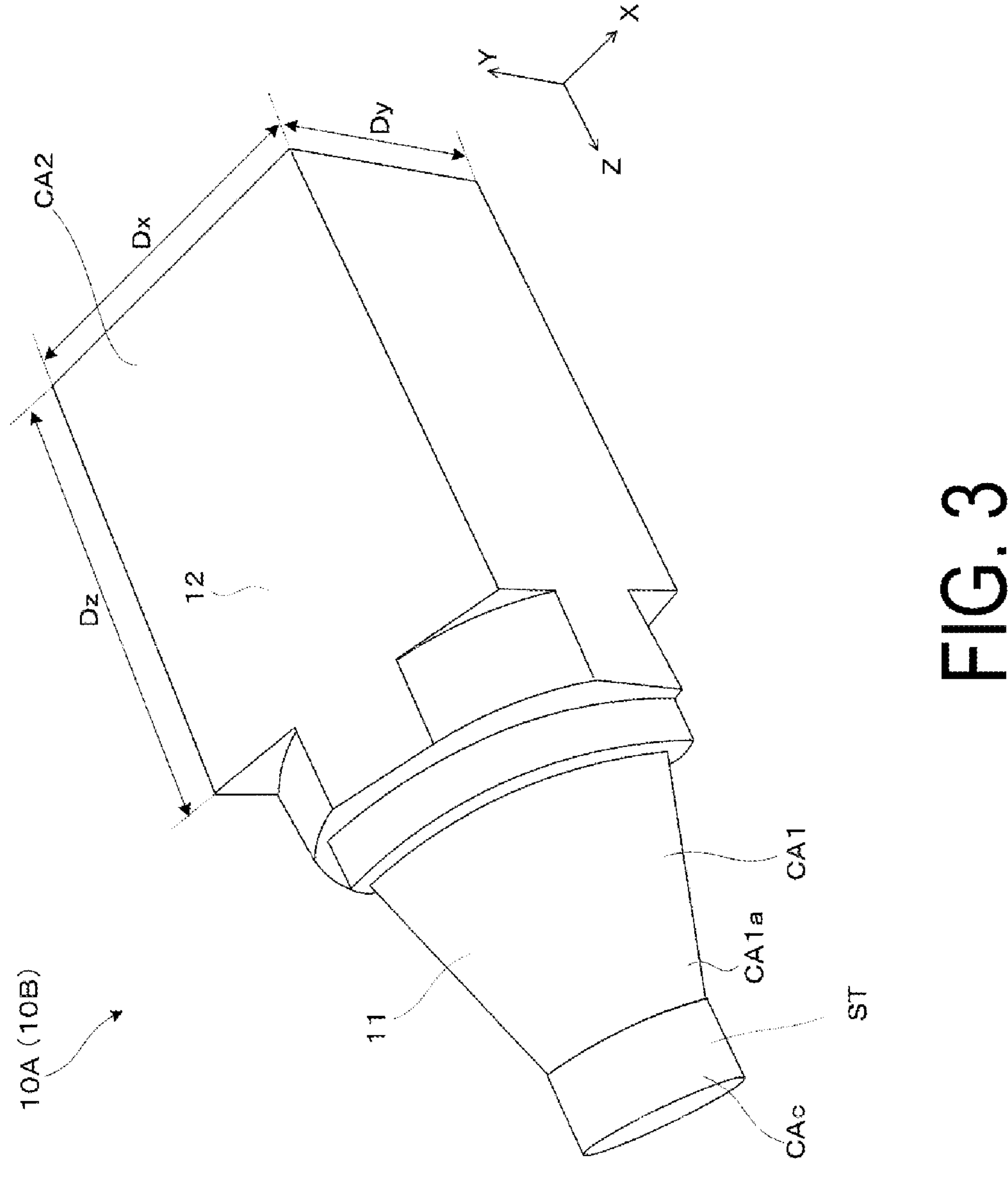
FIG. 3 is a perspective view illustrating an external appearance of an imaging device of the optical measurement device.

As described above, also from a view point of moving the first imaging device 10A and the second imaging device 10B, it is important to reduce the sizes of the first imaging device 10A and the second imaging device 10B. In view of this, in this embodiment, in the first imaging device 10A (the second imaging device 10B), not only a first case CA1 with a cone shape (truncated cone shape) in which the diaphragm (opening diaphragm) and the optical member (lens group) are disposed, but also a second case CA2 with a cuboid shape in which the image sensor and the like are disposed has a small size as with the external appearance illustrated in the perspective view of FIG. 3, for example. For example, when a width (lateral length) Dx in the X direction, a width (height) Dy in the Y direction and a width (vertical length) Dz in the Z direction of the second case CA2 are approximately 2 to 4 cm, it is anticipated that the part of the second case CA2 does not interfere with other nearby components and the like even when it makes axis rotation and the like.

Figure 4:
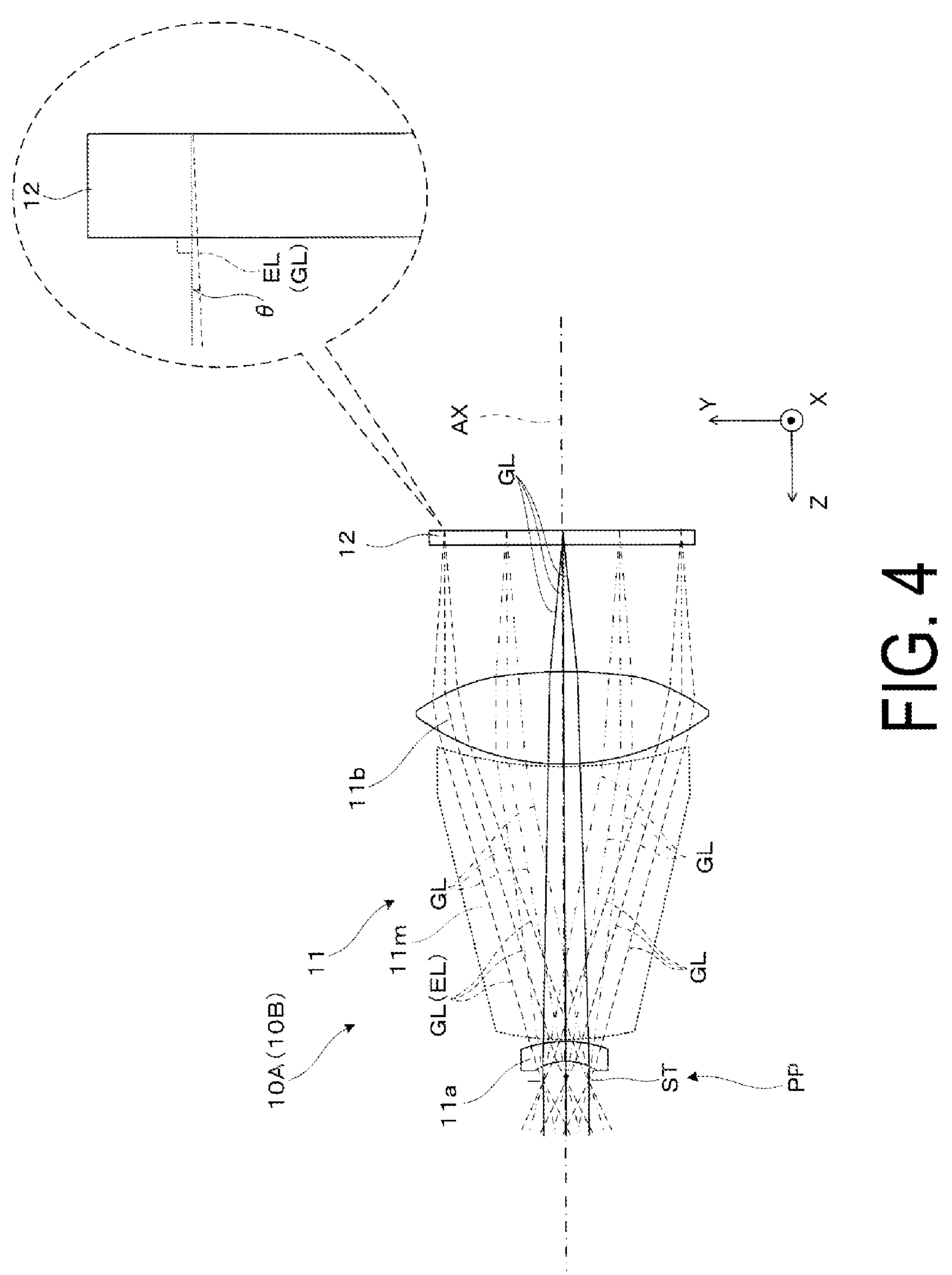
FIG. 4 is a light-beam diagram illustrating reception of light from a measurement target in the imaging device.
Figure 5:
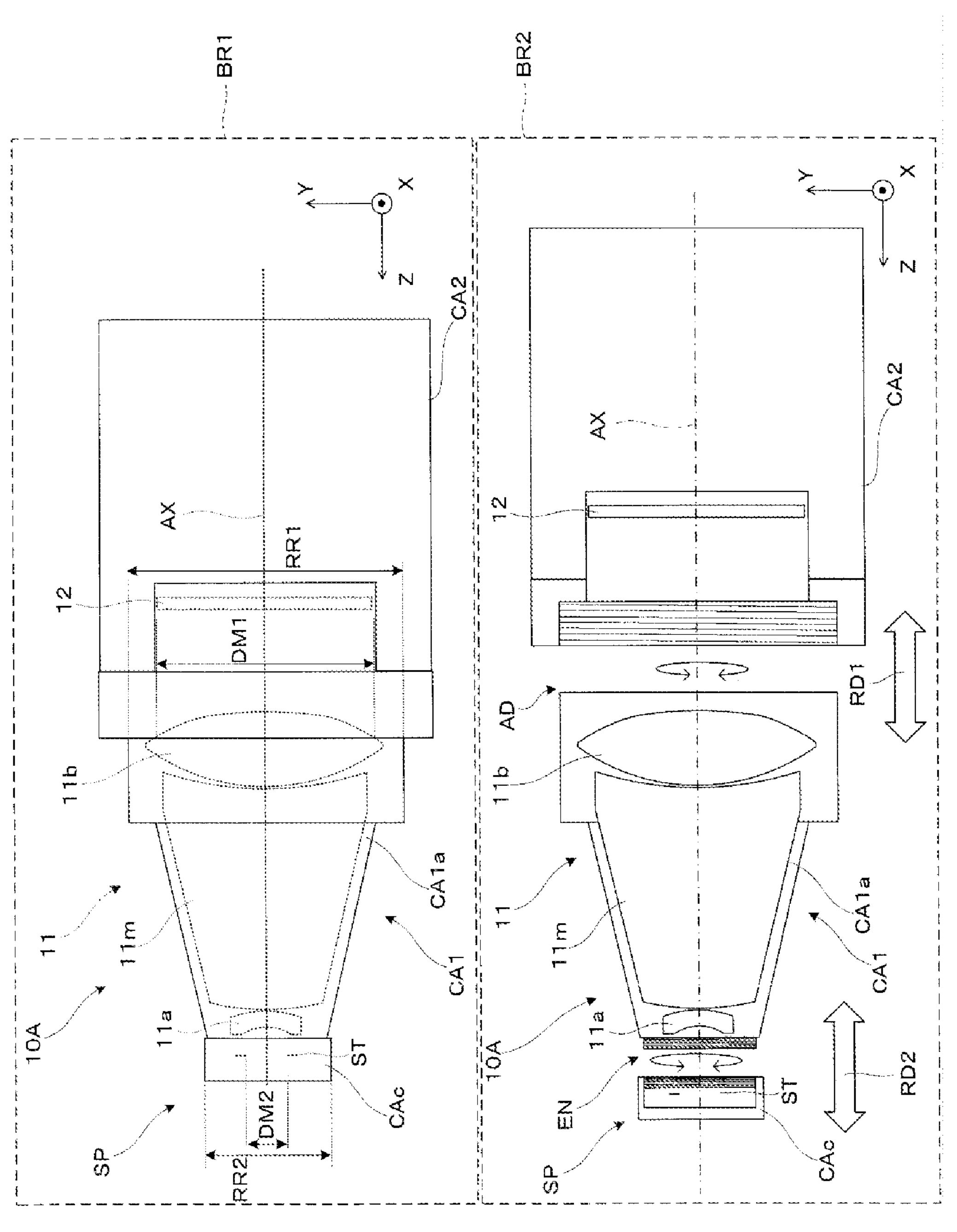
FIG. 5 is a diagram for describing a structure of the imaging device.

An exemplary configuration of the first imaging device 10A is described in more detail below with reference to FIG. 4 and the like. Note that since the second imaging device 10B has a similar configuration, the illustration and description thereof are omitted. FIG. 4 is a light-beam diagram illustrating reception of image light GL (light from the measurement target) in the first imaging device 10A. In addition, FIG. 5 is a diagram for describing a structure of the first imaging device 10A. A state BR1 is a conceptual side view of the first imaging device 10A, a state BR2 is a conceptual side sectional view of the first imaging device 10A, and a state where each unit making up an optical system is housed in the first case CA1 and the second case CA2 is illustrated. Note that as illustrated in the drawing, the first case CA1 and the second case CA2 are detachable. Specifically, the first case CA1 and the second case CA2 can be moved back and forth in the direction (the ±Z direction) indicated with a bidirectional arrow RD1.

As illustrated in FIG. 4, the first imaging device 10A includes an imaging lens 11, a light reception member 12, and a diaphragm (opening diaphragm) ST as parts making up an optical system. The imaging lens 11 is composed of a plurality of lenses, i.e., a lens group rotationally symmetrical about the optical axis AX extending along the Z direction as a reference axis. In this example, in the lenses, the lens on the most object side (+Z side) is a first optical member 11*a*, the lens on the most image side (−Z side) is a second optical member 11*b*, and one or more lenses (lens group) located between them are an intermediate optical member 11*m*. In the following description, the direction in which the optical axis AX extends and in which the first optical member 11*a* and the second optical member 11*b* are disposed side by side (the −Z direction in the example illustrated in the drawing) is referred to as first direction.

In addition, in the above-described case, it can also be understood that the central axis of the first optical member 11*a*, the central axis of the second optical member 11*b*, and the central axis of the light reception member 12 coincide with each other with the reference axis set as the optical axis AX in the cross-sectional view illustrated in the drawing.

As described above, the diaphragm (opening diaphragm) ST is disposed on the object side (+Z side) than the imaging lens 11 so as to be disposed at the position of the pupil formed by the image light GL from the virtual image display device VD serving as a measurement target (see FIG. 2). More specifically, first, as described above, in the virtual image display device VD, there is a position where the batch of the light beam of the image light GL emitted from each light emission point is superimposed (intersected) and the batch of the light beam of the entirety of the image light GL becomes thinnest, and in this case, this position is an exit pupil PP of the virtual image display device VD. When the human eye is set at this position of the exit pupil PP for the virtual image display device VD, the entire image as a virtual image is appropriately visually recognized with the image light GL entering the eye. Therefore, in this case, by disposing the diaphragm (opening diaphragm) ST at the position of the exit pupil PP so that the first imaging device 10A functions as a substitute for the human eye, accurate performance evaluation is achieved.

In the imaging lens 11, the first optical member 11*a* is the lens disposed on the most object side (+Z side) as described above, and is the lens where the image light GL from the exit pupil that is formed on the image side of the virtual image display device VD serving as a measurement target enters. The first optical member 11*a* emits the incident (entering) image light GL toward the intermediate optical member 11*m*, which is an optical system located in the rear stage (downstream side) of the light path, and further toward the second optical member 11*b* and the light reception member 12. Note that in the example illustrated in the drawing, the incidence surface of the image light GL in the first optical member 11*a* has a shape that is convex toward the light reception member 12. In addition, the first optical member 11*a* is an aspheric lens.

In the imaging lens 11, the second optical member 11*b* is the lens disposed on the most image side (−Z side) as described above, and emits, toward the light reception member 12, the image light GL transmitted through and emitted from the first optical member 11*a* and the intermediate optical member 11*m*. In particular, in this embodiment, the second optical member 11*b* emits, with telecentricity, the incident image light GL. In addition, the second optical member 11*b* is an aspheric lens.

Note that the intermediate optical member 11*m* is disposed between the first optical member 11*a* and the second optical member 11*b* and composed of a plurality of lenses, for example. The intermediate optical member 11*m* changes the light path of the passing image light GL through refraction action in conjunction with the first optical member 11*a* and the second optical member 11*b*.

The light reception member 12 is composed of an image sensor expanded along the plane parallel to the XY plane and disposed on the rear stage side (−Z side) of the second optical member 11*b* along the first direction in which the first optical member 11*a* and the second optical member 11*b* are disposed side by side. The light reception member 12 receives, at a light reception surface 12*r*, the image light GL emitted from the second optical member 11*b*.

Here, in the above-described manner, the parts of the first imaging device 10A that receives the image light GL are each incorporated in the first case CA1 with a cone shape (truncated cone shape) and the second case CA2 with a cuboid shape as described above, and as illustrated in FIG. 5. More specifically, the diaphragm ST and the imaging lens 11 are housed in the first case CA1, while the light reception member 12 and members such as a circuit component omitted in the drawing are housed in the second case CA2. Further, the first case CA1 is composed of an imaging lens housing case CA1*a* that houses the imaging lens 11 and a diaphragm housing case CAc that houses the diaphragm ST, and the diaphragm housing case CAc is attachable to and detachable from the imaging lens housing case CA1*a*. Specifically, replacement of the diaphragm ST and the like can be made by moving the diaphragm housing case CAc and the imaging lens housing case CA1*a* back and forth in the direction (first direction) indicated with a bidirectional arrow RD2.

Note that in the above-described configuration, an outer diameter RR1 of the first case CA1 on the image side is larger than an outer diameter RR2 of the first case CA1 on the object side.

In addition, a light emission range DM1 in the second optical member 11*b* is larger than a light passage range DM2 in the diaphragm (opening diaphragm) ST. That is, the height of the imaging lens 11 at the optical element emission surface is larger than the height at the diaphragm ST, which is a diaphragm part.

In addition, as described above, the first case CA1 and the second case CA2 are detachable, i.e., replacement of the imaging lens 11 and the like, and relative position adjustment between the imaging lens 11 and the light reception member 12 can be made. In the example illustrated in the drawing, a thread is provided at the connecting part of the first case CA1 and the second case CA2, and by attaching the first case CA1 by rotating and inserting the first case CA1 into the second case CA2 so as to move it back and forth in the first direction indicated with the bidirectional arrow RD1 and to adjust the distance from the second optical member 11*b* of the imaging lens 11 to the light reception member 12, the light path can be adjusted so as to form an image of the image light GL received at the light reception surface 12*r* of the light reception member 12. In other words, a rotating mechanism such as the above-described thread functions as an adjusting member AD for adjusting the light path for the image light GL. Regarding the performance evaluation of the virtual image display device VD, a case is anticipated in which the focal length of light from the measurement target (the virtual image display device VD) or more specifically the position of the virtual image at the virtual image display device VD is not as anticipated especially in the initial evaluation stage, which requires focus adjustment with the adjusting member AD and the like as in the above-described example in the preliminary stage of the evaluation. In the above-described configuration, the rotating mechanism such as the above-described thread is used as a distance adjuster DD (the adjusting member AD) for adjusting the relative distance of the entire imaging lens 11 collectively with respect to the light reception member 12 so as to form an image of the image light GL received at the light reception surface 12*r* of the light reception member 12. Note that the rotating mechanism such as the above-described thread is an example of the adjusting member AD (or the distance adjuster DD), and in this case, the distance adjuster DD is provided on the image side of the second optical member 11*b*. It should be noted that the adjusting member AD (the distance adjuster DD) is not limited to the above-described member, and it is conceivable to adopt various configurations such as a configuration in which the light path is adjusted with a helicoid mechanism and the like, for example. In addition, the adjustment operation is also not limited to a manual operation, and may be an automatic operation.

In addition, for the imaging lens housing case CA1*a* and the diaphragm housing case CAc making up the first case CA1, a thread is provided at their connecting part, and thus the diaphragm ST housed in the diaphragm housing case CAc can be replaced. As a typical example, it is conceivable to prepare, as opening diaphragm members SP, a plurality of the diaphragm housing cases CAc housing respective diaphragms ST with different opening diameters such that they are replaceable as necessary. In this case, from a different perspective, in the imaging lens housing case CA1*a*, the thread provided on the object side of the first optical member 11*a* functions as an engaging portion EN that engages with the opening diaphragm member SP so that the diaphragm ST is replaceable. Note that the light emission range DM1 in the second optical member 11*b* is larger than the light passage range DM2 in the opening diaphragm member SP regardless of the member selected from among a plurality of the opening diaphragm members SP. In addition, the outer diameter of the first case CA1 serving as a lens barrel that houses the optical element is also larger than the height at the diaphragm ST corresponding to the light passage range DM2 in the opening diaphragm member SP.

Figure 6:
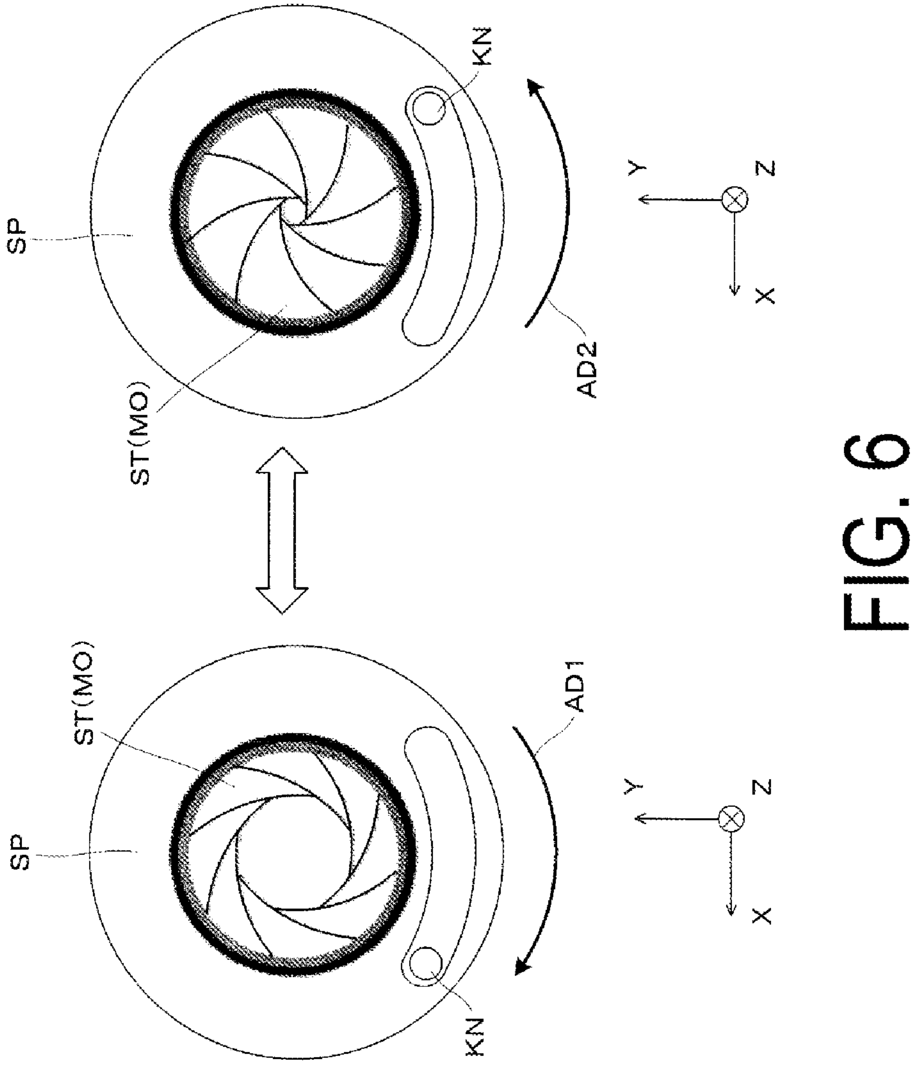
FIG. 6 is a front view for describing an example of a diaphragm (opening diaphragm).

Note that regarding the mechanism of the opening diaphragm member SP including the diaphragm ST, it is conceivable to adopt a configuration in which the opening diaphragm member SP includes a variable diaphragm MO with a changeable opening diameter as the diaphragm ST as exemplified in FIG. 6 as well as the above-described mechanism, for example. Specifically, it is possible to adopt a configuration in which the size of the opening diameter can be adjusted as necessary by moving a knob KN of the opening diaphragm member SP in an arrow AD1 direction and an arrow AD2 direction opposite to the arrow AD1 direction as illustrated in the drawing.

In addition, in this embodiment, as described above, the image light GL is emitted with telecentricity from the second optical member 11*b* of the imaging lens 11. In general, in the case of an optical system with no telecentricity, the size of the image projected on the image plane changes in accordance with a change of the object position on the object side. If an optical system with no telecentricity is adopted as the first imaging device 10A, when adjustment is made on the first imaging device 10A side because the position of the virtual image in the virtual image display device VD is not as anticipated, the size of the image formed on the light reception surface 12*r* of the light reception member 12 is changed. In this case, the evaluation itself may be hindered when the field of view (FOV) of the virtual image display device VD is unknown, and/or when the ratio of the light beam of the image light GL occupying the light reception surface 12*r* of the light reception member 12 changes and affects the measurement of the resolution. In view of this, in this embodiment, such a situation is avoided or reduced with the configuration in which the optical system (optical element) making up the first imaging device 10A is provided with telecentricity as described above.

Here, regarding the degree of the telecentricity that the imaging lens 11 should have, various configurations may be considered in accordance with the required measurement accuracy and the like. For example, as illustrated in FIG. 4 in a partially enlarged manner, it is conceivable to adopt a configuration in which in the image light GL emitted from the second optical member 11*b* toward the light reception surface 12*r* of the light reception member 12 (received at the light reception surface 12*r* of the light reception member 12), an incident angle (incident angle of main light beam) θ of a component EL with the most off-axis image height at the light reception surface 12*r* is within 10 degrees.

Figure 7:
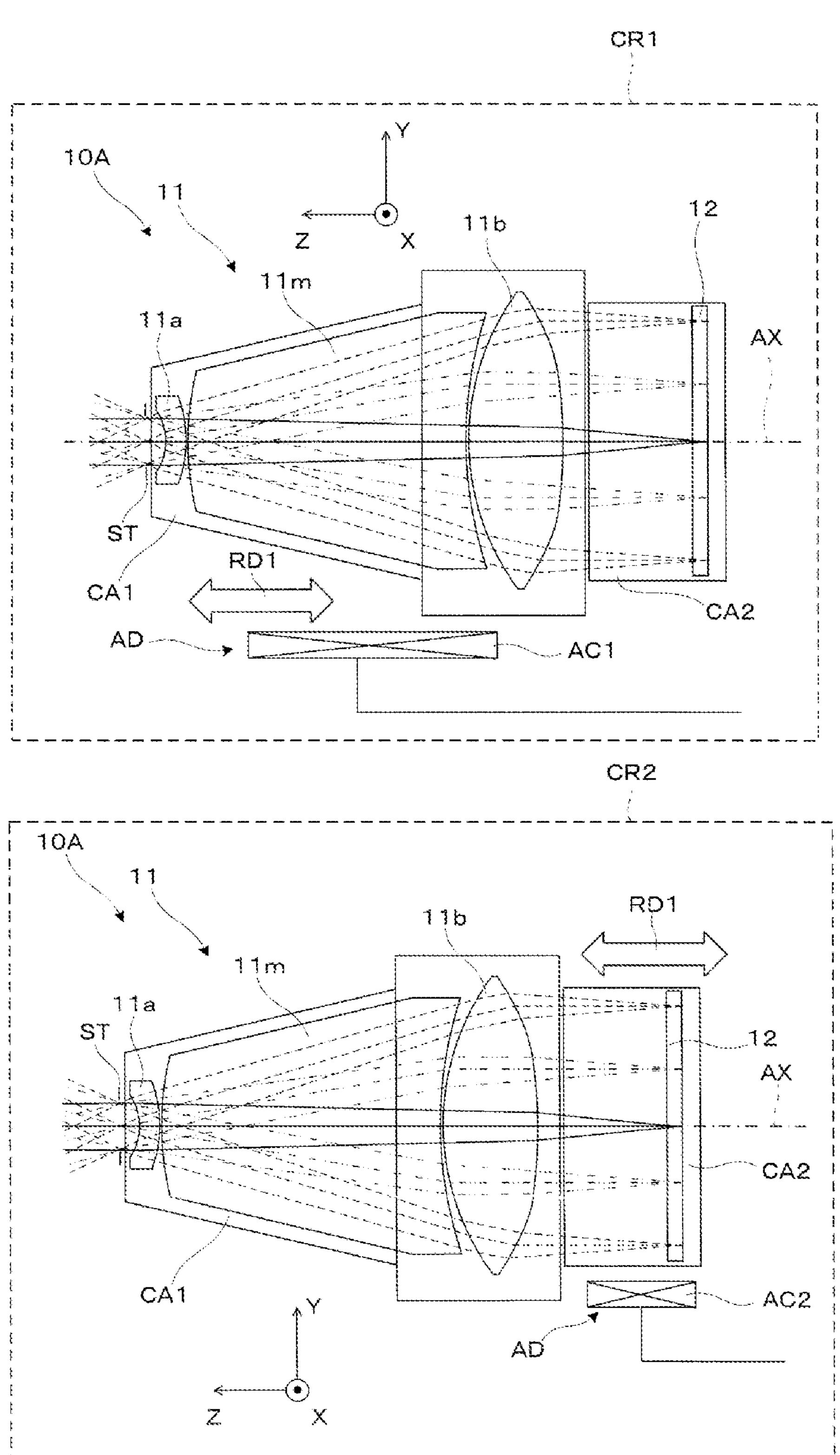
FIG. 7 is a diagram illustrating another example of a structure of the imaging device in the optical measurement device.

In addition, in the above-described case, regarding the imaging device (e.g., the first imaging device 10A) in the optical measurement device 100, the adjusting member AD is composed of the distance adjuster DD composed of the rotating mechanism such as a thread, and the distance adjuster DD adjusts the positions of the first case CA1 and the second case CA2 in the first direction. As the adjusting member AD (the distance adjuster DD) for adjusting the positions of the first case CA1 and the second case CA2, it is conceivable adopt, as well as the above-described configuration, a configuration including a driving device AC1 for moving the first case CA1 back and forth in the first direction indicated with the bidirectional arrow RD1 as illustrated as another example in a state CR1 in FIG. 7, for example. Alternatively, as illustrated as a state CR2, it is also possible to adopt a configuration including a driving device AC2 for moving the second case CA2 back and forth in the first direction indicated with the bidirectional arrow RD1. Alternatively, both the driving devices AC1 and AC2 may be provided. Specifically, in this case, the driving device AC1 and the driving device AC2 function as the adjusting member AD or the distance adjuster DD.

Figure 8:
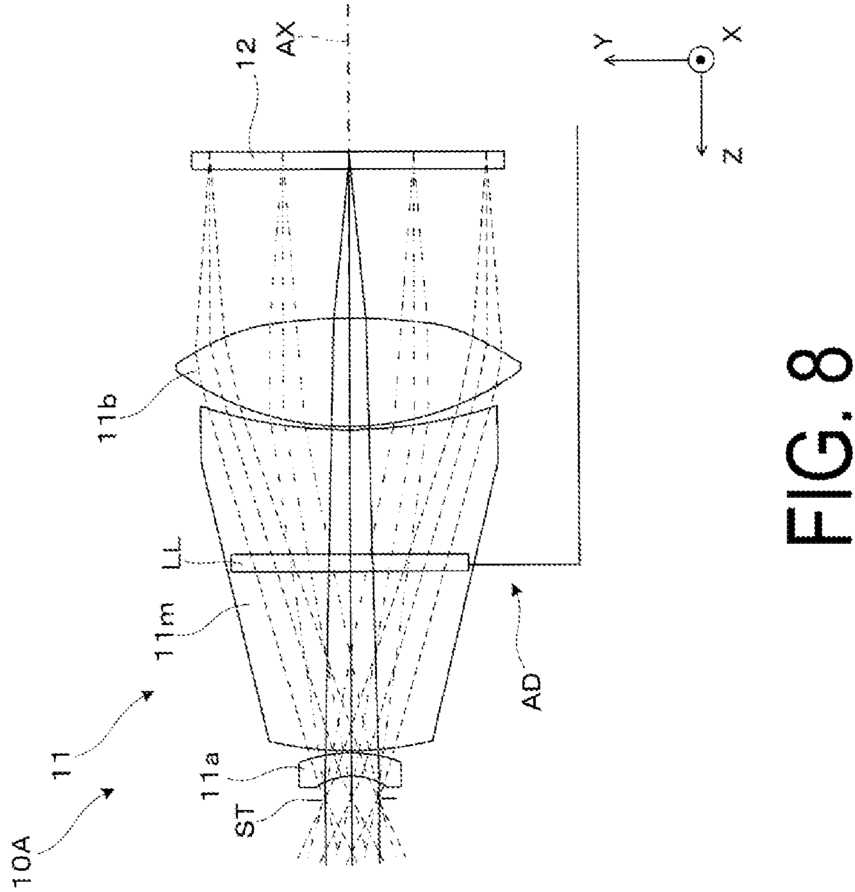
FIG. 8 is a diagram illustrating another example of a structure of the imaging device.

Further, as another example, as exemplified in FIG. 8, it is conceivable to adopt a configuration including a liquid crystal lens LL between the first optical member 11*a* and the second optical member 11*b* in the first direction. Specifically, it is possible to adopt a configuration in which the adjusting member AD includes the liquid crystal lens LL. In this case, the required light path is adjusted by adjusting the refractive index of the liquid crystal lens LL. In addition, the configuration with such a liquid crystal lens LL may be combined with other configurations described above to constitute the adjusting member AD.

Note that in view of the foregoing, in the first posture changing device 30A and the second posture changing device 30B illustrated in FIG. 1 and the like, the postures of the first optical member 11*a*, the second optical member 11*b*, and the light reception member 12 are integrally changed.

As described above, the optical measurement device 100 includes the first optical member 11*a* where the image light GL from the virtual image display device VD serving as a measurement target is incident, the first optical member 11*a* being configured to emit the incident image light GL, the second optical member 11*b* where the image light GL emitted from the first optical member 11*a* enters, the second optical member 11*b* being configured to emit, with telecentricity, the incident image light GL, the light reception member 12 disposed along the first direction in which the first optical member 11*a* and the second optical member 11*b* are disposed side by side, and configured to receive the image light GL emitted from the second optical member 11*b*, and the adjusting member AD configured to adjust the light path so as to form an image of the image light GL received at the light reception surface 12*r* of the light reception member 12. In the above-described optical measurement device 100, the light from the virtual image display device VD serving as a measurement target is emitted with telecentricity toward the light reception member 12, and the light path is adjusted by the adjusting member AD so as to form an image of the light received at the light reception surface 12*r* of the light reception member 12. In this manner, the adjustment regarding the light reception at the light reception member 12 can be performed in accordance with the focal length regarding the image light GL from the virtual image display device VD, and even when the focal length on the virtual image display device VD side is changed in the above-described adjustment, the optical characteristics can be accurately measured while suppressing the variation in the size of the image (the size of the virtual image) received on the light reception side, for example.

Second Embodiment

Figure 9:
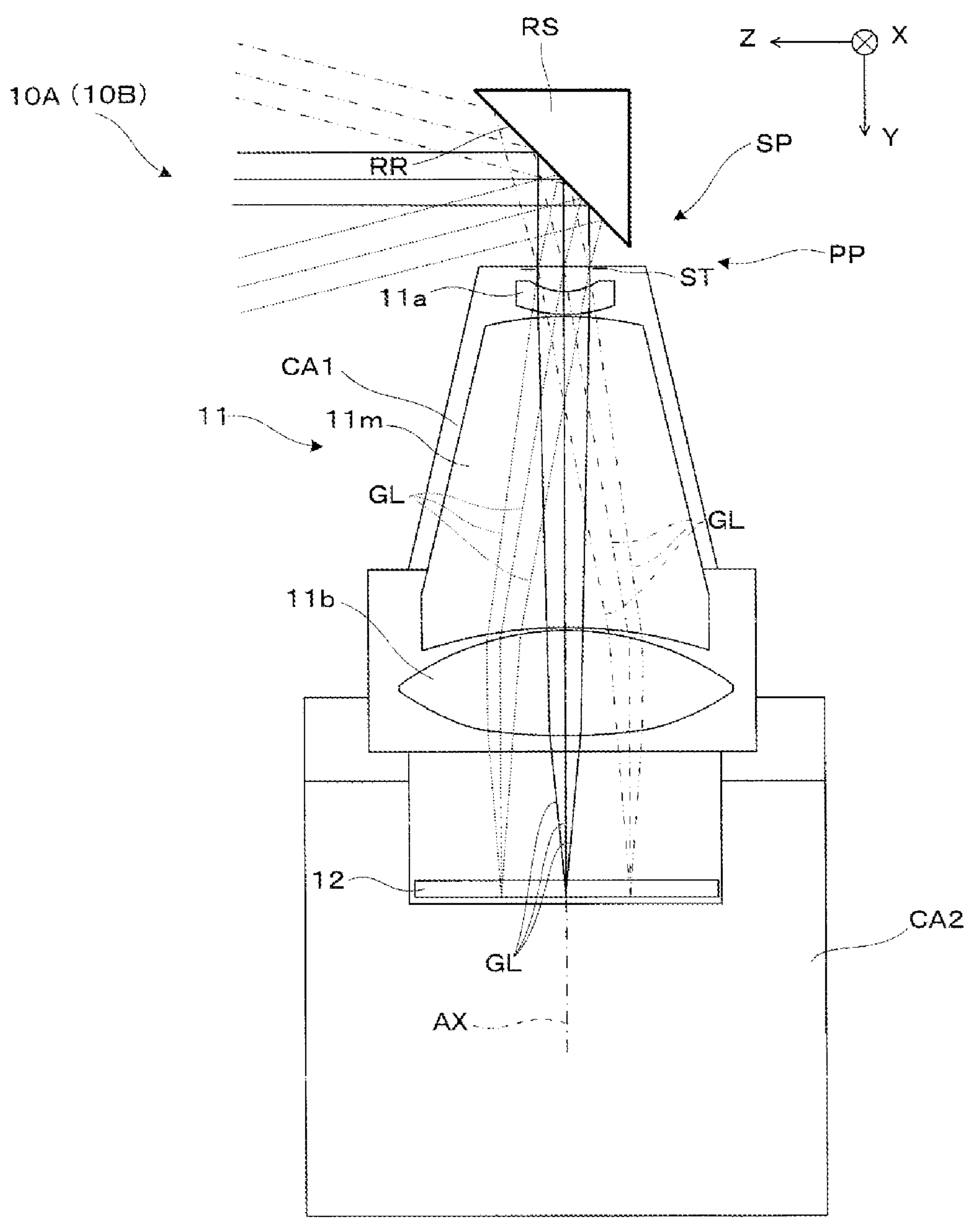
FIG. 9 is a schematic diagram illustrating an optical measurement device according to a second embodiment.

An optical measurement device according to a second embodiment of the present disclosure is described below with reference to FIG. 9 and the like. The optical measurement device 100 of this embodiment is different from the case of the first embodiment in that a reflection member RS is further provided at a front stage of the diaphragm (opening diaphragm) ST in the opening diaphragm member SP including the diaphragm (opening diaphragm) ST. Note that the configurations after the diaphragm ST are the same as those of the case of the first embodiment, and therefore the description thereof is omitted.

Figure 10:
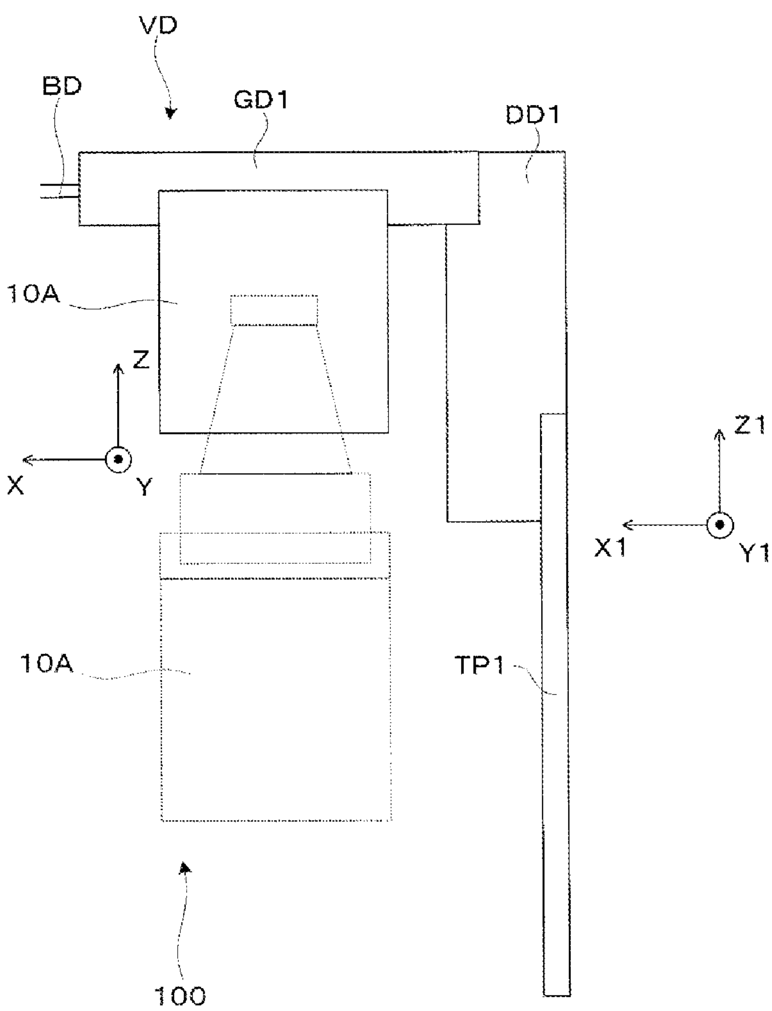
FIG. 10 is a schematic plan view illustrating the optical measurement device.
Figure 11:
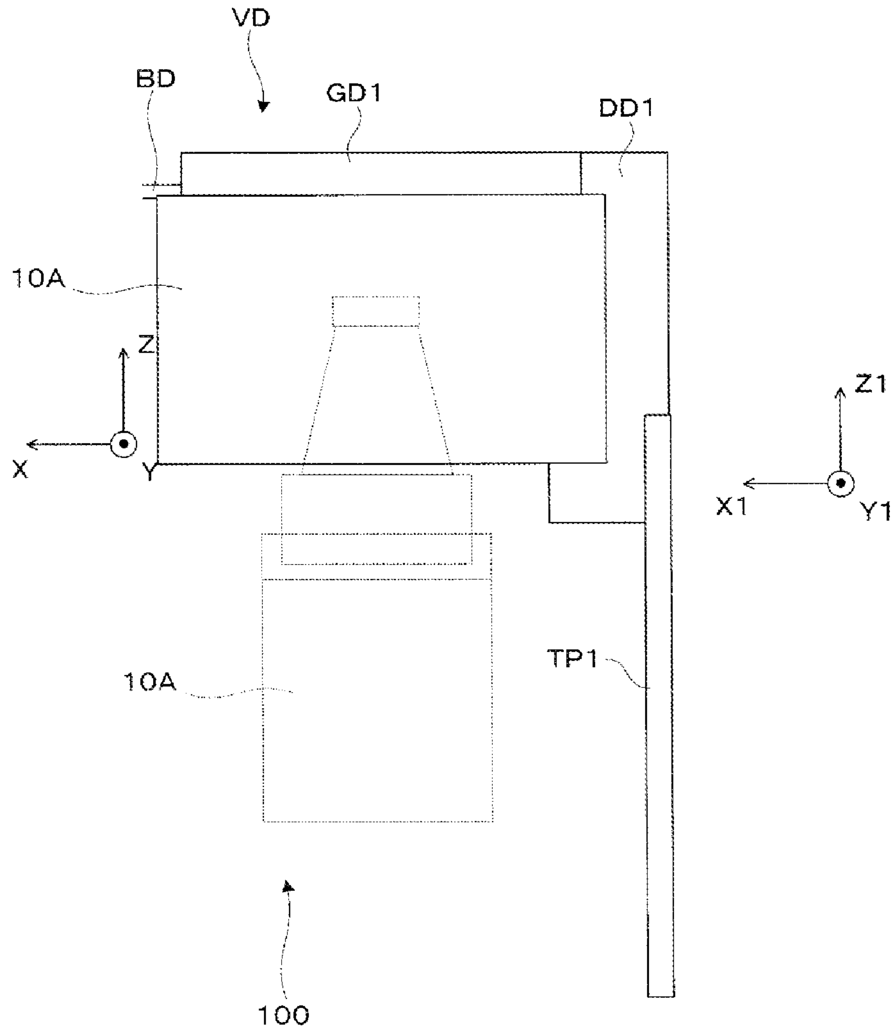
FIG. 11 is a schematic plan view illustrating an optical measurement device of a modification.

As illustrated in the drawing and as described above, in this embodiment, in the opening diaphragm member SP in the optical measurement device 100, the reflection member RS includes a reflection surface RR that is disposed on the object side of the diaphragm ST and reflects, toward the first optical member 11*a*, the image light GL from the measurement target (not illustrated). Specifically, the light path of the image light GL is bent by the reflection member RS. More specifically, in the example illustrated in the drawing, the image light GL emitted from the measurement target (not illustrated) so as to enter from the −Z direction as a whole is bent in the +Y direction as a whole through reflection at the reflection surface RR of the reflection member RS. In this case, the first imaging device 10A located at the position indicated with the broken line in FIG. 10 in the first embodiment can be changed such that it is set on the +Y1 side in the default state as indicated with the solid line in FIG. 10. In this case, for example, the optical system of the optical measurement device 100 can be disposed at a position separated from the side head and the like in the virtual image display device VD. Therefore, it is conceivable to adopt, as the first imaging device 10A, an imaging device with a larger optical system in comparison with the case of FIG. 10 as exemplified in FIG. 11, for example.

Figure 12:
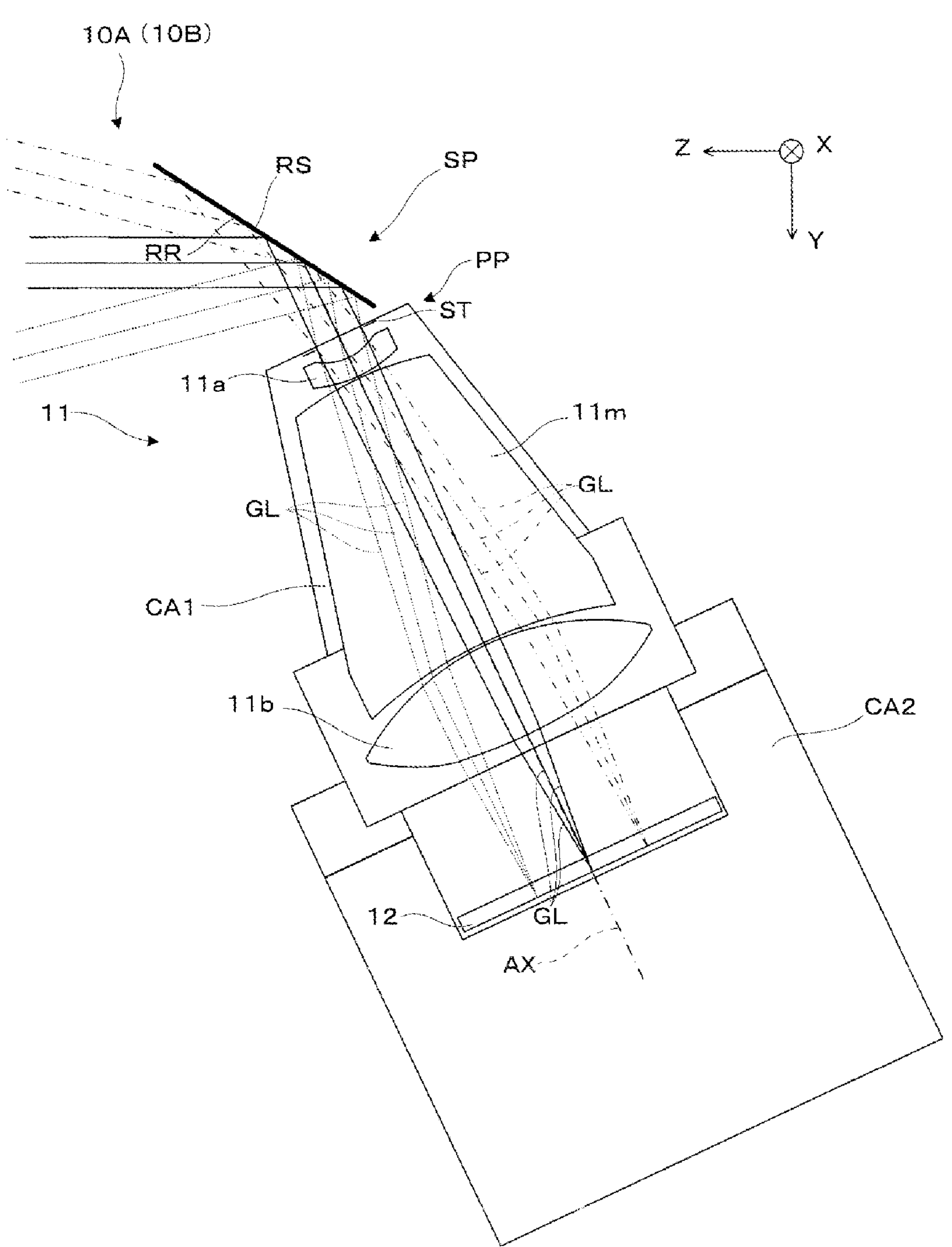
FIG. 12 is a schematic plan view illustrating an optical measurement device of another modification.

Note that while the light path of the image light GL is bent at substantially 90 degrees by the reflection member RS (from the −Z direction to the +Y direction) in the above-described example, this is not limitative, and it is conceivable to adopt a configuration in which the light is bent in an oblique direction (a direction other than 90 degrees) as illustrated in FIG. 12, for example.

Note that while the illustration and description thereof are omitted, the installation position of the second imaging device 10B can be changed as with the case of the first imaging device 10A. Note that the bending direction may be different between the first imaging device 10A and the second imaging device 10B.

Also in this embodiment, when adjusting the light path of the image light GL from the measurement target, the optical characteristics can be accurately measured while suppressing the variation in the size of the image (the size of the virtual image) received on the light reception side. In addition, in this embodiment, by bending the light path of the image light GL by the reflection member RS before the light reaches the imaging lens 11, various installation positions and configurations of imaging device 10A and the like may be achieved.

Third Embodiment

Figure 13:
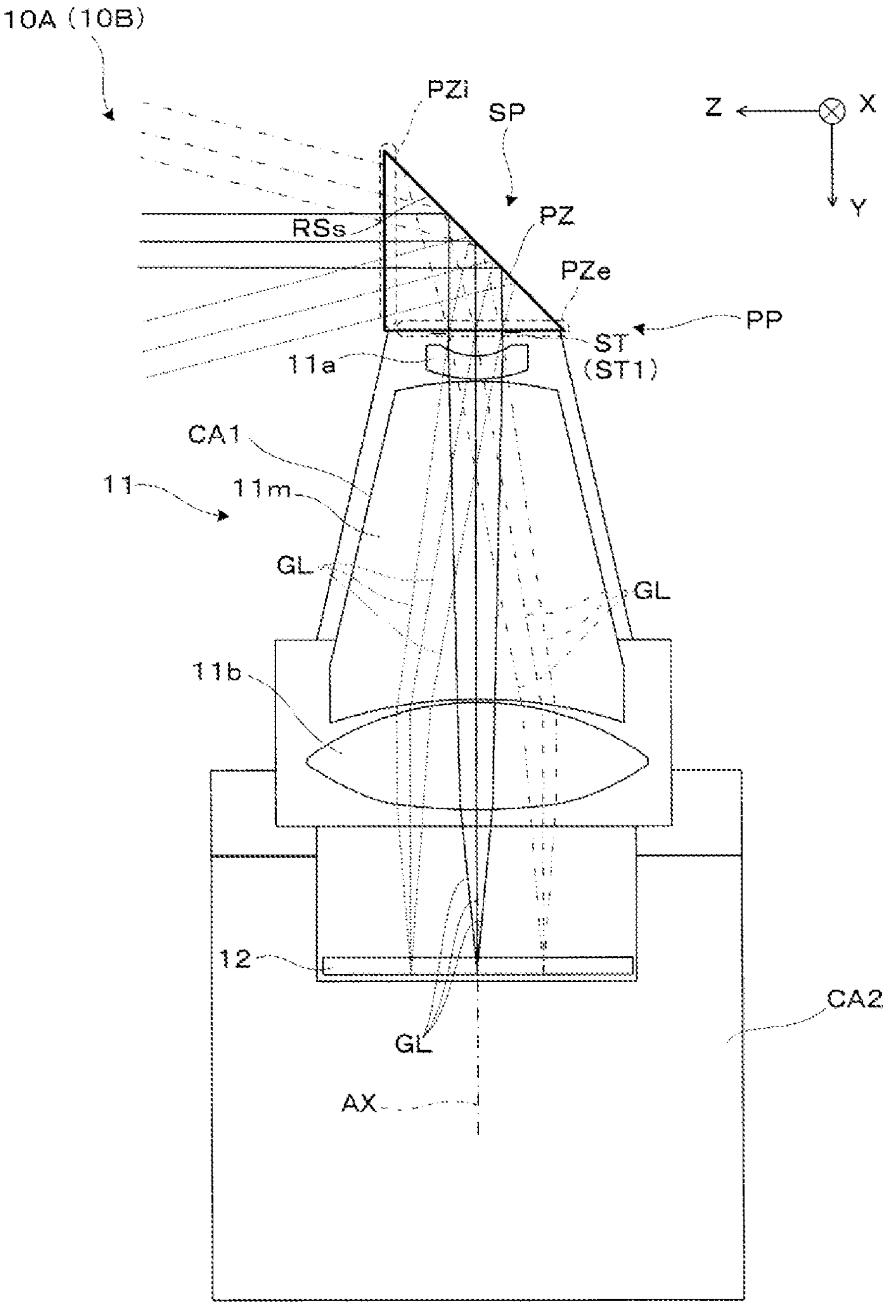
FIG. 13 is a schematic diagram illustrating an optical measurement device according to a third embodiment.
Figure 14:
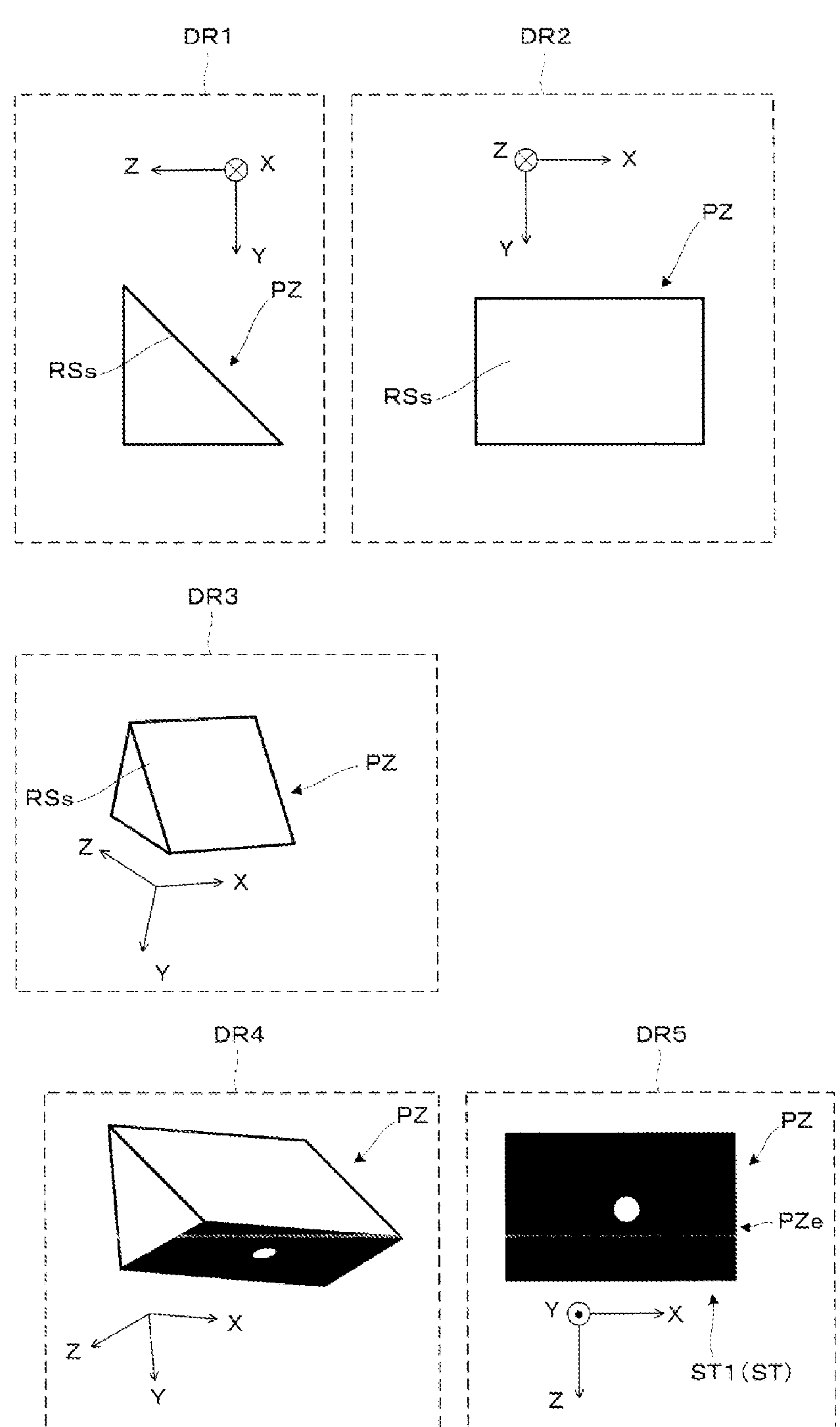
FIG. 14 is a diagram for describing a structure of a prism.

An optical measurement device according to a third embodiment of the present disclosure is described below with reference to FIG. 13 and the like. The optical measurement device 100 of this embodiment is different from the case of the first embodiment and the like in that a prism PZ including a reflection member RSs is provided at the opening diaphragm member SP including the diaphragm (opening diaphragm) ST. FIG. 13 is a schematic diagram illustrating an optical measurement device according to this embodiment. In addition, FIG. 14 is a diagram for describing an example of a structure of the prism PZ, and schematically illustrates external appearances of the prism PZ as viewed from different angles in state DR1 to DR5.

As illustrated in FIG. 13, the prism PZ is an optically transparent member with a triangular prism shape, and includes an incident portion PZi forming an incidence surface at one side surface of the triangular prism shape as an incidence member where the image light GL from the measurement target (not illustrated) enters, the reflection member RSs forming a reflection surface at another side surface of the triangular prism shape, and an emission portion PZe forming an emission surface at another side surface of the triangular prism shape as the emission member that emits the incident image light GL. In this case, the reflection member RSs reflects, toward the emission portion (emission member) PZe, the image light GL incident from the incident portion (incidence member) PZi. In addition, among them, the diaphragm (opening diaphragm) ST is formed at the emission surface of the emission portion PZe. Specifically, the emission surface of the emission portion PZe corresponds to the position of the exit pupil of the image light GL from the measurement target.

Figure 15:
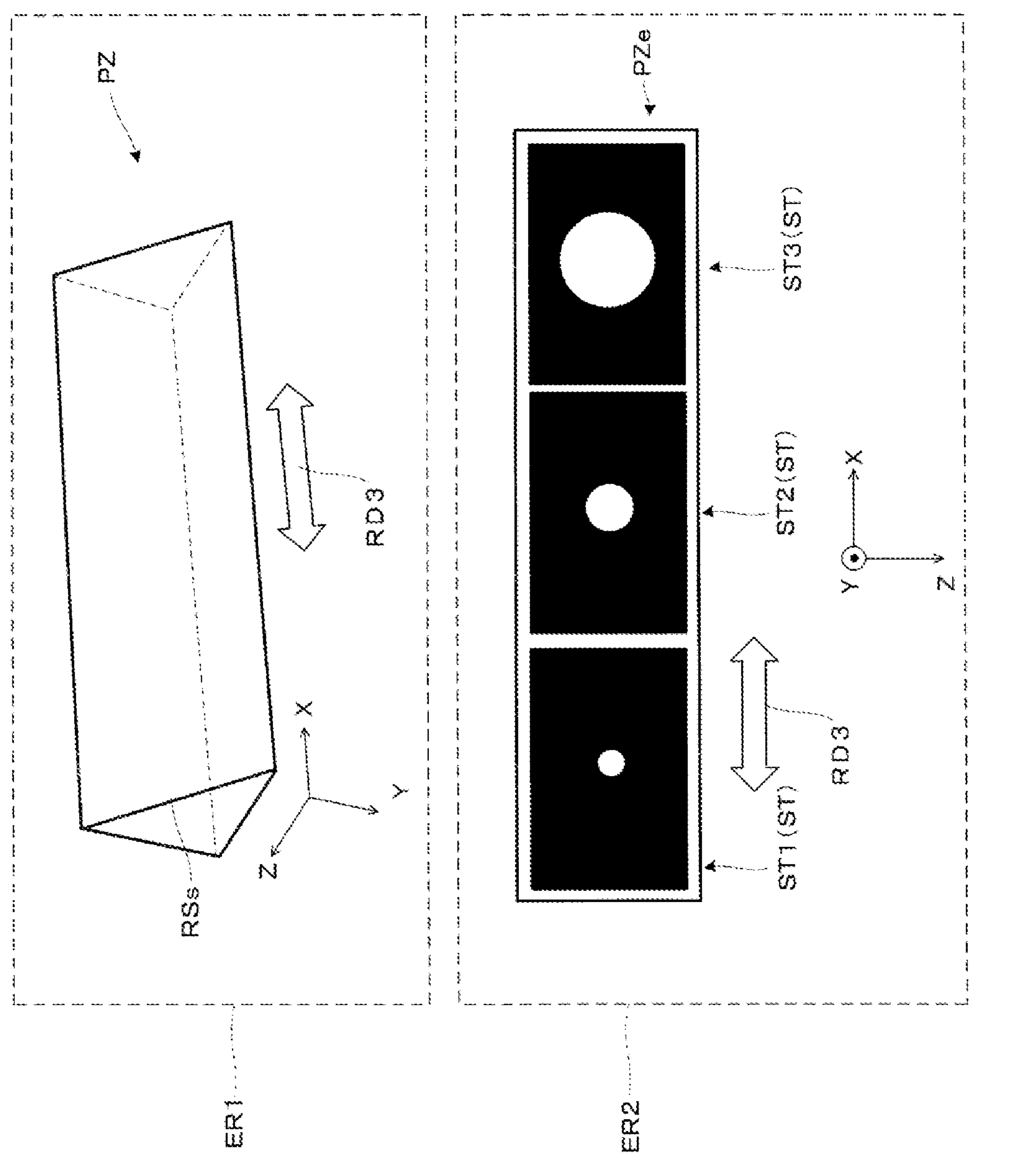
FIG. 15 is a diagram for describing a structure of a prism of a modification.

In addition, here, the diaphragm ST provided at the emission surface of the emission portion PZe is a first diaphragm ST1. Specifically, the first diaphragm ST1 serving as the diaphragm ST is provided at the emission portion (emission member) PZe. Regarding the configuration of the diaphragm ST, it is possible to adopt not only the configuration in which only one first diaphragm ST1 is provided as illustrated in the drawing, but also the configuration in which a second diaphragm ST2 with an opening diameter different from that of the first diaphragm ST1 and the like is provided in addition to the first diaphragm ST1 as illustrated in FIG. 15 as an example of a structure of the prism PZ of a modification. More specifically, the prism PZ in FIG. 15 has a laterally long shape as illustrated in a state ER1 of FIG. 15 corresponding to the state DR3 of FIG. 14, and in addition, the second diaphragm ST2 and third the diaphragm ST3 with an opening diameter different from that of the first diaphragm ST1 are provided at the emission portion (emission member) PZe in a slidable manner in a second direction (the ±X direction) intersecting the first direction (the −Z direction), i.e., the direction indicated with a bidirectional arrow RD3 as illustrated in a state ER2 of FIG. 15 corresponding to the state DR5 of FIG. 14. In this manner, the opening diameter is variable.

Also in this embodiment, when adjusting the light path of the image light GL from the measurement target, the optical characteristics can be accurately measured while suppressing the variation in the size of the image (the size of the virtual image) received on the light reception side. In addition, in this embodiment, by bending the light path of the image light GL by the reflection member RSs before the light reaches the imaging lens 11, various installation positions and configurations of imaging device 10A and the like may be achieved.

Modifications, Etc

The invention is not limited to the above embodiments, but can be implemented in various forms to the extent that it does not depart from the gist of the invention. For example, the following modification may be made.

While the measurement target is the virtual image display device VD that forms the exit pupil PP in the above-described case, this is not limitative, and it may be the virtual image display device VD that does not form the exit pupil PP. For example, the measurement target may be a virtual image display device using a Birdbath optical system.

In addition, while the Z direction is the direction that coincides with the axis direction of the optical axis AX of the optical system making up the first imaging device 10A in the above-described case, this is not limitative. The Z direction and the optical axis AX may be different directions, taking into account any convergence angle.

Figure 16:
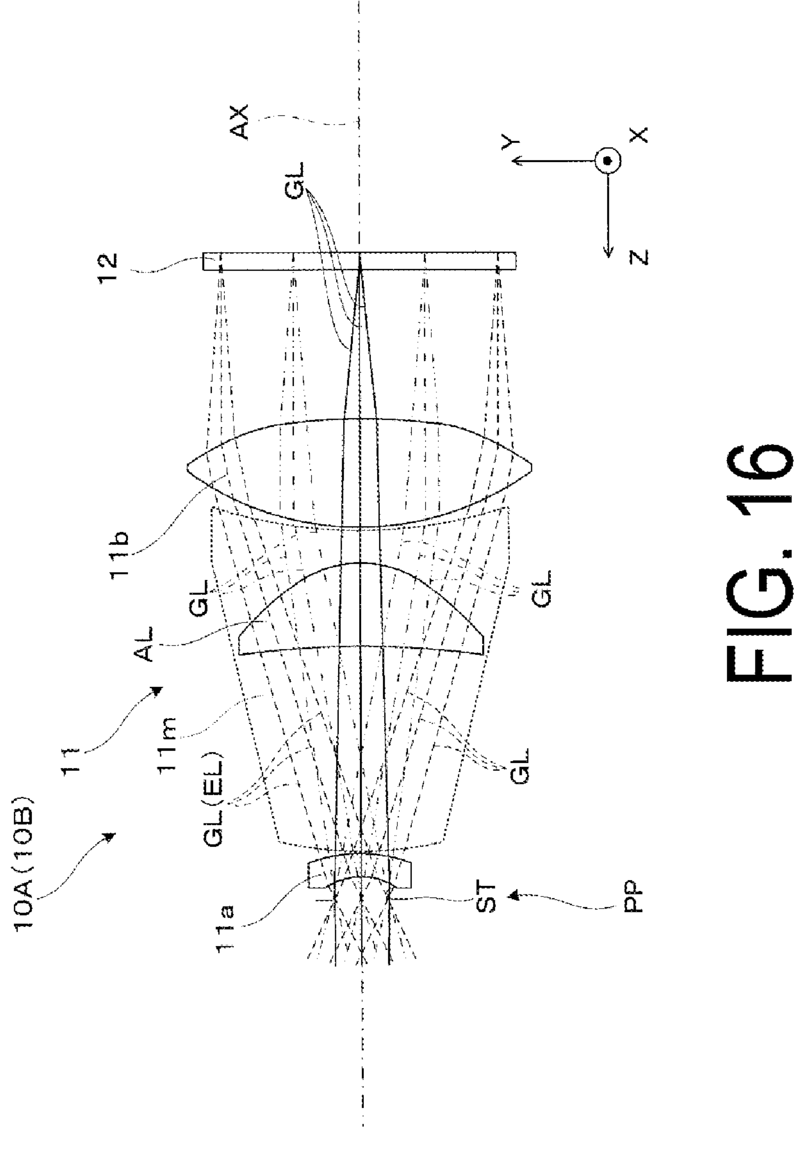
FIG. 16 is a diagram for describing an imaging device of a modification.

In addition, for example, while the intermediate optical member 11*m* is composed of a plurality of lenses and the like in the above-described case, an aspheric lens AL may be included as the lens making up the intermediate optical member 11*m* as in an example illustrated in FIG. 16.

In addition, while the measurement target is the virtual image display device VD such as a head-mounted display (HMD) in the above-described case, the measurement target is not limited to this, and it is conceivable to adopt various optical systems such as binoculars, scopes, or handheld displays that are not worn on the head and looked into like binoculars as other forms of an HMD, for example. In addition, it is applicable to so-called closed head-mounted display devices (HMD) that block out outside light and allow only image light to be seen. In this case, a so-called video see-through product composed of a virtual image display device and an imaging device may be a measurement target.

An optical measurement device in a specific aspect includes a first optical member where light from a measurement target is incident, the first optical member being configured to emit the incident light, a second optical member where the light emitted from the first optical member is incident, the second optical member being configured to emit, with telecentricity, the incident light, a light reception member disposed along a first direction in which the first optical member and the second optical member are disposed side by side, the light reception member being configured to receive the light emitted from the second optical member, and an adjusting member configured to adjust a light path so as to form an image of light received at a light reception surface of the light reception member.

In the above-described optical measurement device, the light from the measurement target is emitted with telecentricity toward the light reception member, and the light path is adjusted with the adjusting member so as to form an image of the light received at the light reception surface of the light reception member. In this manner, the adjustment regarding the light reception at the light reception member in accordance with the focal length regarding the light from the measurement target can be performed, and even when the focal length on the measurement target side is changed in the above-described adjustment, the optical characteristics can be accurately measured while suppressing the variation in the size of the image (the size of the virtual image) received on the light reception side.

In a specific aspect, the adjusting member adjusts a distance from the second optical member to the light reception member in the first direction. In this case, the required light path adjustment can be performed by changing the distance from the second optical member to the light reception member.

In a specific aspect, the adjusting member is provided on an image side of the second optical member.

In a specific aspect, the adjusting member includes a liquid crystal lens provided between the first optical member and the second optical member in the first direction. In this case, the required light path adjustment can be performed by adjusting the refractive index of the liquid crystal lens.

A specific aspect further includes a first case configured to house the first optical member and the second optical member, and a second case configured to house the light reception member. The adjusting member adjusts positions of the first case and the second case in the first direction. In this case, the required light path adjustment can be performed by adjusting the positions of the first case and the second case.

In a specific aspect, an outer diameter of the first case on an image side is greater than an outer diameter of the first case on an object side. In this case, size reduction of the member that houses the optical system can be achieved.

A specific aspect further includes an opening diaphragm member disposed on an object side of the first optical member. In this case, an evaluation based a state of simulating a human pupil hole can be achieved.

A specific aspect further includes an engaging portion configured to engage with the opening diaphragm member on the object side of the first optical member. In this case, replacement of the diaphragm and the like can be achieved.

In a specific aspect, a light emission range of the second optical member is larger than a light passage range of the opening diaphragm member. In this case, size reduction of the optical system can be achieved.

In a specific aspect, the opening diaphragm member includes a variable diaphragm. In this case, an evaluation reflecting opening and closing of a human pupil hole can be achieved.

In a specific aspect, the opening diaphragm member includes a reflection member configured to reflect, toward the first optical member, the light from the measurement target. In this case, by bending the light path of the light from the measurement target with the reflection member, various installation positions and configurations of the optical system such as the first optical member may be adopted.

In a specific aspect, the opening diaphragm member includes an incidence member where the light from the measurement target is incident, an emission member configured to emit the incident light, and a reflection member configured to reflect, toward the emission member, light incident from the incidence member. The emission member is provided with a first diaphragm. In this case, by bending the light path of the light from the measurement target incident from the incidence member with the reflection member and emitting it from the emission member, it is possible to adopt various installation positions and configurations of the optical system such as the first optical member, and provide the first diaphragm as the opening diaphragm at an accurate position.

In a specific aspect, the emission member includes a second diaphragm with an opening diameter different from that of the first diaphragm, and the first diaphragm and the second diaphragm are disposed so as to be slidable in a second direction intersecting the first direction. In this case, the opening diameter can be changed by sliding the first diaphragm and the second diaphragm in the second direction.

In a specific aspect, the second optical member performs emission toward the light reception member such that an angle of a most off-axis image height of the light received at the light reception member is within 10 degrees. In this case, the telecentricity can be suitably maintained.

In a specific aspect, in a cross-sectional view, a central axis of the first optical member, a central axis of the second optical member, and a central axis of the light reception member coincide with each other.

In a specific aspect, an incidence surface of light in the first optical member has a shape that is convex toward the light reception member.

In a specific aspect, the second optical member is an aspheric lens. In this case, the light can be emitted in a desired state toward the light reception member.

A specific aspect further includes a posture changing device configured to integrally change postures of the first optical member, the second optical member, and the light reception member. In this case, with the posture changing device, the position can be changed to accommodate the individual differences in eye position and eye movement.

What is claimed is:

1. An optical measurement device comprising:

a first optical member where light from a measurement target is incident, the first optical member being configured to emit the incident light;

a second optical member where the light emitted from the first optical member is incident, the second optical member being configured to emit, with telecentricity, the incident light;

a light reception member disposed along a first direction in which the first optical member and the second optical member are disposed side by side, the light reception member being configured to receive the light emitted from the second optical member;

an adjusting member configured to adjust a light path so as to form an image of light received at a light reception surface of the light reception member; and a posture changing device configured to move the first optical member, the second optical member, the light reception member, and the adjusting member relative to the measurement target in three directions, wherein the second optical member is an aspheric lens.

2. The optical measurement device according to claim 1, wherein the adjusting member adjusts a distance from the second optical member to the light reception member in the first direction.

3. The optical measurement device according to claim 2, wherein the adjusting member is provided on an image side of the second optical member.

4. The optical measurement device according to claim 1, wherein the adjusting member includes a liquid crystal lens provided between the first optical member and the second optical member in the first direction.

5. The optical measurement device according to claim 1, further comprising:

a first case configured to house the first optical member and the second optical member; and a second case configured to house the light reception member, wherein the adjusting member adjusts positions of the first case and the second case in the first direction.

6. The optical measurement device according to claim 5, wherein an outer diameter of the first case on an image side is greater than an outer diameter of the first case on an object side.

7. The optical measurement device according to claim 1, further comprising an opening diaphragm member disposed on an object side of the first optical member.

8. The optical measurement device according to claim 7, further comprising an engaging portion configured to engage with the opening diaphragm member on the object side of the first optical member.

9. The optical measurement device according to claim 7, wherein a light emission range of the second optical member is larger than a light passage range of the opening diaphragm member.

10. The optical measurement device according to claim 7, wherein the opening diaphragm member includes a variable diaphragm.

11. The optical measurement device according to claim 7, wherein the opening diaphragm member includes a reflection member configured to reflect, toward the first optical member, the light from the measurement target.

12. The optical measurement device according to claim 7, wherein the opening diaphragm member includes:

an incidence member where the light from the measurement target is incident;

an emission member configured to emit the incident light; and a reflection member configured to reflect, toward the emission member, light incident from the incidence member, wherein the emission member is provided with a first diaphragm.

13. The optical measurement device according to claim 12, wherein the emission member includes a second diaphragm with an opening diameter different from that of the first diaphragm, and the first diaphragm and the second diaphragm are disposed so as to be slidable in a second direction intersecting the first direction.

14. The optical measurement device according to claim 1, wherein the second optical member performs emission toward the light reception member such that an angle of a most off-axis image height of the light received at the light reception member is within 10 degrees.

15. The optical measurement device according to claim 1, wherein in a cross-sectional view, a central axis of the first optical member, a central axis of the second optical member, and a central axis of the light reception member coincide with each other.

16. The optical measurement device according to claim 1, wherein an incidence surface of light in the first optical member has a shape that is convex toward the light reception member.

17. The optical measurement device according to claim 1, further comprising a posture changing device configured to integrally change postures of the first optical member, the second optical member, and the light reception member.

18. The optical measurement device according to claim 1, wherein the posture changing device is configured to move in a range corresponding to an eye-box range of the measurement target.

19. The optical measurement device according to claim 1, wherein the optical measurement device has two sets of assemblies each including the first optical member, the second optical member, the light reception member, the adjusting member, and the posture changing device, the measurement target is a head-mounted display, the head-mounted display has two measurement target portions, and the two sets of assemblies of the optical measurement device measure the two measurement target portions of the head-mounted display in one-to-one correspondence.

* * * * *